United States Patent
Reisinger et al.

(10) Patent No.: US 12,140,661 B2
(45) Date of Patent: Nov. 12, 2024

(54) CONTROL DEVICE FOR A MOTOR VEHICLE ACCESS OR LOCATING SYSTEM AND METHOD

(71) Applicant: Continental Automotive GmbH, Hannover (DE)

(72) Inventors: Thomas Reisinger, Regenstauf (DE); Maximilian Treindl, Wenzenbach (DE); Markus Doering, Straubing (DE)

(73) Assignee: Continental Automotive GmbH, Hannover (DE)

( * ) Notice: Subject to any disclaimer, the term of this patent is extended or adjusted under 35 U.S.C. 154(b) by 364 days.

(21) Appl. No.: 17/630,701

(22) PCT Filed: Jul. 22, 2020

(86) PCT No.: PCT/EP2020/070727
§ 371 (c)(1),
(2) Date: Jan. 27, 2022

(87) PCT Pub. No.: WO2021/018702
PCT Pub. Date: Feb. 4, 2021

(65) Prior Publication Data
US 2022/0260703 A1 Aug. 18, 2022

(30) Foreign Application Priority Data
Jul. 30, 2019 (DE) ...................... 10 2019 211 264.1

(51) Int. Cl.
*G01S 13/76* (2006.01)
*G01S 5/02* (2010.01)

(52) U.S. Cl.
CPC ........... *G01S 13/765* (2013.01); *G01S 5/0218* (2020.05)

(58) Field of Classification Search
CPC .............................. G01S 13/765; G01S 5/0218
See application file for complete search history.

(56) References Cited

U.S. PATENT DOCUMENTS

| | | | |
|---|---|---|---|
| 2015/0175025 A1* | 6/2015 | Barbul | G01V 3/10 320/108 |
| 2015/0338512 A1* | 11/2015 | HomChaudhuri | G01S 13/765 370/252 |

(Continued)

FOREIGN PATENT DOCUMENTS

| | | |
|---|---|---|
| DE | 102017207830 A1 | 9/2018 |
| EP | 3255805 A1 | 12/2017 |
| WO | 2015179154 A2 | 11/2015 |

OTHER PUBLICATIONS

Shaohua Wu et al. "High precision ranging with IR-UWB: a compressed sensing approach", Wireless Communications and Mobile Computing Wirel. Commun. Mob. Comput 2016; 16:3015-3031; Published online Sep. 30, 2016 in Wiley Online Library (wileyonlinelibrary.com), DOI: 10.1002/wcm.2742, Research Article.

(Continued)

*Primary Examiner* — Bernarr E Gregory
*Assistant Examiner* — Hailey R Le

(57) ABSTRACT

Disclosed are a control device for a motor vehicle access or locating system and a method for operating a motor vehicle access or locating system, having the steps of: identifying a received signal that has travelled from a transmitter to a receiver of a control device along the strongest signal path, the peak path, as the peak path signal; determining the time of flight, ToF, of the peak path signal; determining a time interval, δ, of the time of flight of the peak path signal; determining a threshold value, T, for the reliability of a first path search depending on δ; carrying out the first path search at δ taking the threshold value into consideration.

15 Claims, 6 Drawing Sheets

(56) References Cited

U.S. PATENT DOCUMENTS

| | | |
|---|---|---|
| 2018/0081024 A1* | 3/2018 | Li .......................... G01S 5/0218 |
| 2018/0275267 A1 | 9/2018 | Reisinger et al. |
| 2019/0004155 A1 | 1/2019 | Eber et al. |
| 2021/0034160 A1* | 2/2021 | Hof ....................... G06F 3/0416 |

OTHER PUBLICATIONS

"P802.15.4z/D01Draft Standard for Low-Rate Wireless Networks Amendment: Enhanced Ultra Wide-Band (UWB) Physical Layers (PHYs) and Associated Ranging Techniques" Standard IEEE802.15.4z, 2019.

Office Action dated Jan. 30, 2020 from corresponding German patent application No. DE 10 2019 211 264.1.

International Search Report and Written Opinion dated Nov. 24, 2020 from corresponding International patent application No. PCT/EP2020/070727.

* cited by examiner

FIG 3A

| | | | | | Body damping | Max. Link quality First Path | Max. Link quality Peak Path | First Path dynamic |
|---|---|---|---|---|---|---|---|---|
| 1 | | | | | | | | |
| 2 | | | | | -35 db | -100 dB | -90 dB | 30 dB |
| 3 | Not relevant | | | | Relevant scenario | | | |
| 4 | (Distance gain too small) | | | | (First path could be detected) | | | |
| | Achievable distance | | | | Scenarios not realistic | | | |
| 5 | Relevant for connection scenario | | | | (Connection quality insufficient) | | | |
| 6 | | | | | | | | |

| | Distance User<->Kfz | Delta Peak Path - First Path | Direct Path | Reflected Path | Direct Path Path loss | Direct Path Reinforcement | Direct Path Total Loss | Reflected Path Path Loss | Dynamic required |
|---|---|---|---|---|---|---|---|---|---|
| 17 | 1.0 m | 1.0 m | 1.0 m | 2.0 m | -49 dB | -35 db | -84 dB | -55 dB | 29 dB |
| 18 | 1.0 m | 2.0 m | 1.0 m | 3.0 m | -49 dB | -35 db | -84 dB | -59 dB | 25 dB |
| 19 | 1.0 m | 3.0 m | 1.0 m | 4.0 m | -49 dB | -35 db | -84 dB | -61 dB | 23 dB |
| 20 | 1.0 m | 4.0 m | 1.0 m | 5.0 m | -49 dB | -35 db | -84 dB | -63 dB | 21 dB |
| 21 | 1.0 m | 5.0 m | 1.0 m | 6.0 m | -49 dB | -35 db | -84 dB | -65 dB | 19 dB |
| 22 | 1.0 m | 10.0 m | 1.0 m | 11.0 m | -49 dB | -35 db | -84 dB | -70 dB | 14 dB |
| 23 | 1.0 m | 15.0 m | 1.0 m | 16.0 m | -49 dB | -35 db | -84 dB | -72 dB | 12 dB |
| 24 | 1.0 m | 20.0 m | 1.0 m | 21.0 m | -49 dB | -35 db | -84 dB | -75 dB | 9 dB |
| 25 | 2.0 m | 1.0 m | 2.0 m | 3.0 m | -55 dB | -35 db | -90 dB | -59 dB | 31 dB |
| 26 | 2.0 m | 2.0 m | 2.0 m | 4.0 m | -55 dB | -35 db | -90 dB | -61 dB | 29 dB |
| 27 | 2.0 m | 3.0 m | 2.0 m | 5.0 m | -55 dB | -35 db | -90 dB | -63 dB | 27 dB |
| 28 | 2.0 m | 4.0 m | 2.0 m | 6.0 m | -55 dB | -35 db | -90 dB | -65 dB | 25 dB |
| 29 | 2.0 m | 5.0 m | 2.0 m | 7.0 m | -55 dB | -35 db | -90 dB | -66 dB | 24 dB |
| 30 | 2.0 m | 10.0 m | 2.0 m | 12.0 m | -55 dB | -35 db | -90 dB | -71 dB | 19 dB |
| 31 | 2.0 m | 15.0 m | 2.0 m | 17.0 m | -55 dB | -35 db | -90 dB | -72 dB | 18 dB |
| 32 | 2.0 m | 20.0 m | 2.0 m | 22.0 m | -55 dB | -35 db | -90 dB | -75 dB | 15 dB |
| 33 | 3.0 m | 1.0 m | 3.0 m | 4.0 m | -59 dB | -35 db | -94 dB | -61 dB | 33 dB |
| 34 | 3.0 m | 2.0 m | 3.0 m | 5.0 m | -59 dB | -35 db | -94 dB | -63 dB | 31 dB |
| 35 | 3.0 m | 3.0 m | 3.0 m | 6.0 m | -59 dB | -35 db | -94 dB | -65 dB | 29 dB |
| 36 | 3.0 m | 4.0 m | 3.0 m | 7.0 m | -59 dB | -35 db | -94 dB | -66 dB | 28 dB |
| 37 | 3.0 m | 5.0 m | 3.0 m | 8.0 m | -59 dB | -35 db | -94 dB | -67 dB | 27 dB |
| 38 | 3.0 m | 10.0 m | 3.0 m | 13.0 m | -59 dB | -35 db | -94 dB | -71 dB | 23 dB |
| 39 | 3.0 m | 15.0 m | 3.0 m | 18.0 m | -59 dB | -35 db | -94 dB | -72 dB | 22 dB |
| 40 | 3.0 m | 20.0 m | 3.0 m | 23.0 m | -59 dB | -35 db | -94 dB | -75 dB | 19 dB |

FIG 3B

| | | | | | | | | | |
|---|---|---|---|---|---|---|---|---|---|
| 41 | 5.0 m | 1.0 m | 5.0 m | 6.0 m | -63 dB | -35 db | -98 dB | -65 dB | 33 dB |
| 42 | 5.0 m | 2.0 m | 5.0 m | 7.0 m | -63 dB | -35 db | -98 dB | -66 dB | 32 dB |
| 43 | 5.0 m | 3.0 m | 5.0 m | 8.0 m | -63 dB | -35 db | -98 dB | -67 dB | 31 dB |
| 44 | 5.0 m | 4.0 m | 5.0 m | 9.0 m | -63 dB | -35 db | -98 dB | -68 dB | 30 dB |
| 45 | 5.0 m | 5.0 m | 5.0 m | 10.0 m | -63 dB | -35 db | -98 dB | -69 dB | 29 dB |
| 46 | 5.0 m | 10.0 m | 5.0 m | 15.0 m | -63 dB | -35 db | -98 dB | -72 dB | 25 dB |
| 47 | 5.0 m | 15.0 m | 5.0 m | 20.0 m | -63 dB | -35 db | -98 dB | -75 dB | 23 dB |
| 48 | 5.0 m | 20.0 m | 5.0 m | 25.0 m | -63 dB | -35 db | -98 dB | -77 dB | 21 dB |
| 49 | 10.0 m | 1.0 m | 10.0 m | 11.0 m | -69 dB | -35 db | -104 dB | -70 dB | 34 dB |
| 50 | 10.0 m | 2.0 m | 10.0 m | 12.0 m | -69 dB | -35 db | -104 dB | -71 dB | 33 dB |
| 51 | 10.0 m | 3.0 m | 10.0 m | 13.0 m | -69 dB | -35 db | -104 dB | -71 dB | 33 dB |
| 52 | 10.0 m | 4.0 m | 10.0 m | 14.0 m | -69 dB | -35 db | -104 dB | -72 dB | 32 dB |
| 53 | 10.0 m | 5.0 m | 10.0 m | 15.0 m | -69 dB | -35 db | -104 dB | -72 dB | 31 dB |
| 54 | 10.0 m | 10.0 m | 10.0 m | 20.0 m | -69 dB | -35 db | -104 dB | -75 dB | 29 dB |
| 55 | 10.0 m | 15.0 m | 10.0 m | 25.0 m | -69 dB | -35 db | -104 dB | -77 dB | 27 dB |
| 56 | 10.0 m | 20.0 m | 10.0 m | 30.0 m | -69 dB | -35 db | -104 dB | -78 dB | 25 dB |

CONTROL DEVICE FOR A MOTOR VEHICLE ACCESS OR LOCATING SYSTEM AND METHOD

The invention relates to motor vehicle access and locating systems. In particular the invention relates to a control device for a motor vehicle access or locating system, a vehicle with such a control device, an access or locating system with such a control device and a radio key, a method for operating a motor vehicle access or locating system, a program element, and a computer-readable medium.

In access or locating systems, wireless transmission techniques can be applied, for example in association with what are known as radio keys. Various methods can be employed to prevent misuse in order to be able to assess with sufficient security whether proper use is taking place.

It is an object of the invention to develop access or locating systems further.

This object is achieved by means of the subject matter of the independent patent claims. Further refinements of the invention will emerge from the dependent claims and the following description of embodiments.

A first aspect of the invention relates to a control device, in particular for a motor vehicle access or locating system, that is configured to identify a received signal that has travelled from a transmitter, for example a radio key or a mobile telephone, to a receiver of the control device, for example an antenna system of a motor vehicle, along the strongest signal path, what is known as the peak path. This signal is then deemed to be what is known as the peak path signal.

The control device is moreover configured to determine the time of flight (ToF) of the peak path signal. A time interval $\delta$ of the time of flight is also determined, depending, if relevant, on the specified time of flight of the peak path signal. A threshold value T for the reliability of a first path search is then determined depending on $\delta$. The "reliability" of the first path search corresponds to the threshold value that is created in the first path search. This can involve a determination of the similarity of the preamble to the received signal to the expected preamble, depending, if relevant, on the signal-to-noise ratio of the received signal.

The first path search is then carried out at $\delta$ taking the threshold value into consideration.

According to one embodiment, $\delta$ can be the maximum permitted time interval, $\delta_{max}$. In this case, longer time differences are not examined for the presence of a first path signal.

According to one embodiment, a signal detected in the first path search is classified as what is known as the first path signal if the threshold value T was exceeded. The first path search is then ended, since the first path signal has been found and identified.

According to a further embodiment, the control device is configured to conclude that no first path signal has been detected with $\delta$, namely if the threshold value T was not exceeded. A new threshold value, $T_{new}$, is then determined for the reliability of a renewed first path search depending on an enlarged or reduced time interval $\delta-\Delta$ or $\delta+\Delta$, of the time of flight of the peak path signal. The first path search is then carried out again, and is done with the enlarged or reduced time interval $\delta-\Delta$ or $\delta+\Delta$, taking the new threshold value into consideration.

If the first path search is also unsuccessful here, the time interval for the renewed first path search can be enlarged or reduced again, followed by a new determination of a new threshold value. These steps can be carried out until a first path signal was detected. The first path search is then ended.

According to one embodiment, the respective new threshold value, $T_{new}$, is smaller than or equal to the original threshold value, T, and is smaller than or equal to the respective previously ascertained threshold value if the time interval to the peak path signal has reduced.

It is thus a monotonically falling curve that describes the relationship between the time interval of the current first path search and the "security margin" that is to be satisfied.

According to a further embodiment, the control device is configured to adjust the threshold value, T, and/or the new threshold value, $T_{new}$, depending on the function, the installation position, the location and/or time.

A further aspect relates to a vehicle with a control device as described above and below.

A further aspect relates to an access or locating system with a control device as described above and below and a radio key.

A further aspect relates to a method for operating a motor vehicle access or locating system, having the steps of:
- identifying a received signal that has travelled from a transmitter to a receiver of a control device along the strongest signal path, the peak path, as the peak path signal;
- determining the time of flight, ToF, of the peak path signal;
- determining a (possibly maximum allowed) time interval, $\delta_{(max)}$, of the time of flight of the peak path signal;
- determining a threshold value, T, for the reliability of a first path search depending on $\delta_{(max)}$; and
- carrying out the first path search at $\delta_{(max)}$, taking the threshold value into consideration.

A further aspect relates to a program element that, when executed on a control device of a motor vehicle access or locating system, instructs the control device to carry out the steps described above and below.

A further aspect relates to a computer-readable medium on which a program element described above is stored.

Embodiments of the invention are described below with reference to the figures. The illustrations in the figures are schematic and not to scale.

BRIEF DESCRIPTION OF THE FIGURES

FIG. 3 shows numerical examples for first path dynamic requirements.

DETAILED DESCRIPTION OF EMBODIMENTS

Figure 1:
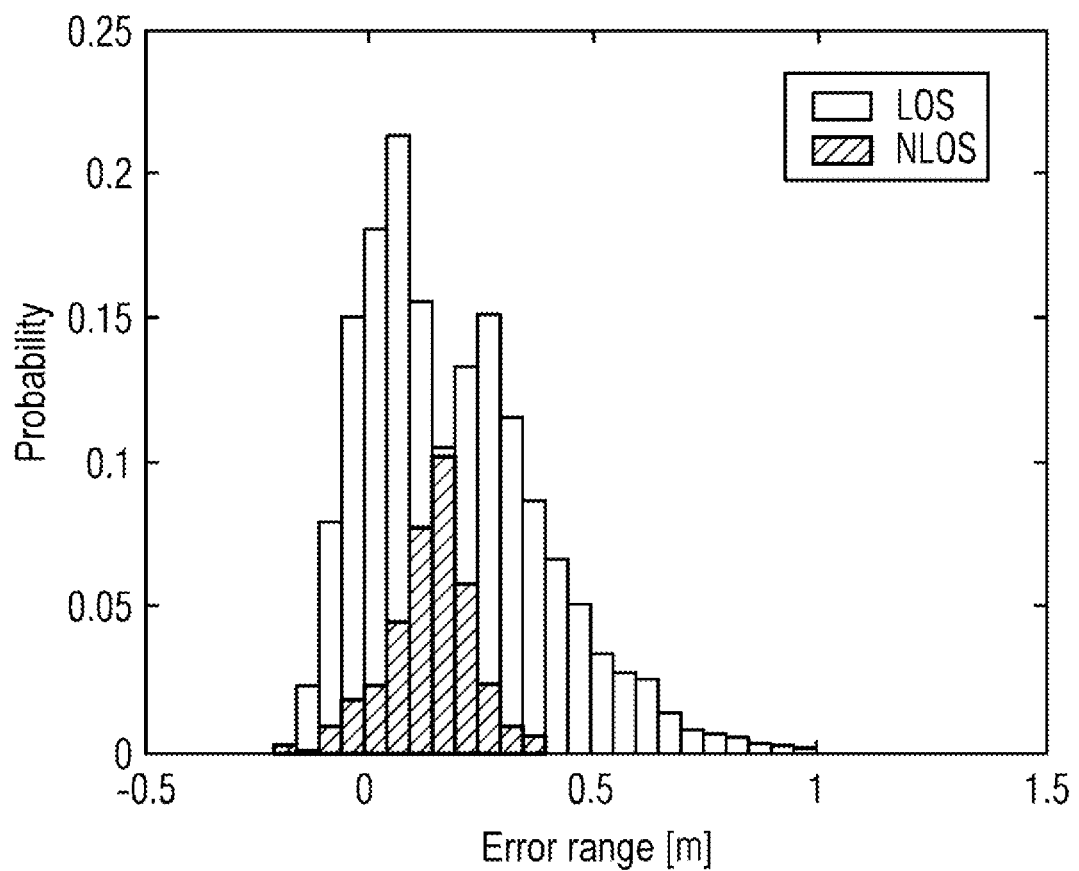
FIG. 1 shows the distribution of the ranging error for LOS and NLOS conditions.

UWB (ultra wide band) secure ranging is employed in association with vehicle access systems. To determine the distance ("ranging"), "two-way ranging" is employed; usually this is "double-sided two-way ranging", which places lower demands on the accuracy of the quartz frequency.

Double-sided two-way ranging describes a communication sequence in which the communication partners generate timestamps for transmitted and received packets. The time of flight (ToF) can then be calculated from the collected timestamps. The ToF and the distance of the communication partner can be converted into one another using the speed of light, on the assumption that the ToF represents the direct path (and not a reflection) between the communication partners.

It is crucial for a high accuracy that the receiver ascertains the time of arrival for each packet, i.e. the time of arrival of the signal, or the reception timestamp, as precisely as possible. This task is not trivial, particularly in reflective environments with multipath propagation, since the interesting direct path can be covered by reflections with higher signal levels.

It can be provided that the receiver performs the signal acquisition on the basis of the strongest signal path (known as the "peak path"), and ascertains an image of the channel through correlation with known symbols or sequences, and through accumulation over a plurality of symbols. The "channel impulse response", CIR, is spoken of in this context. In a reverse search, starting with the peak path, a check is made in postprocessing as to whether signal paths with a lower level are present prior to the peak path. The aim is to recognize the earliest time point of signal arrival, the first path, and to use this point in time as the reception timestamp.

The first path search represents a threshold problem, since the algorithm must distinguish between noise and a valid path. In addition, the highest possible dynamic range, 30 dB for example, between the peak path and the first path is desirable, so that it is still possible to detect the first path even in scenarios with body shadowing.

The introduction of UWB technology to vehicle access systems is in part motivated by the security aspect, since the ToF measurement prevents the "relay attacks" (wireless link extension) that are possible with today's passive access systems. It is, however, important that the ToF measurement is configured in a way that is resistant to manipulation, so that an attack on the ToF measurement, potentially in combination with wireless link extension, cannot compromise the system. In addition to cryptographic measures associated with the data transmission of the measured timestamp, it is crucial that the timestamp ascertainment itself cannot be influenced to the advantage of an attacker.

In "secure ranging" a sequence that is only known to the communication partners is used for this purpose. The term "secure training sequence", STS, is also used in this context. On the basis of this sequence, the receiver performs the correlation and accumulation for the CIR. On the assumption that no other information about the STS used is available to the attacker, he must base a ToF manipulation on an attack with a guessed STS. The attacker can, for example, extend a valid signal and attempt to mimic an earlier first path by inserting a guessed STS ("STS injection"). The manipulation of the ToF measurement that is made possible in this way is called "distance gain". The probability that an attacker guesses an STS that produces a valid path in the CIR represents the security level of an implementation.

Conflicting goals now arise in the first path search in respect of specifying the threshold: for the lowest probability that an attack will be successful, the threshold for a valid path must be set as high as possible. A high threshold means that the first path recognition only accepts paths that can very reliably be based on an actual signal (not on noise or a guessed signal), i.e. requires the path to be as distinct as possible in the CIR. This is in conflict with the aim of achieving the highest possible dynamic range for the first path, or a first path sensitivity, which entails specifying a lowest possible threshold (paths that are not highly distinct or paths that are close to the noise floor are also still accepted). These conflicting goals arise regardless of the concrete implementation of the first path decision threshold.

As a solution to these conflicting goals, the ascertainment of two (or more) timestamps can be provided, wherein one of the timestamps is optimized for (dynamic) performance and a second is optimized for security. Two ToF results are thus finally obtained on the basis of a ranging process: one that is very reliable (security), but possibly inaccurate, and one that is highly accurate (performance), but may have been manipulated; a decision about their use can be made on a functional level.

The security value could thus perhaps be used for "relay attack defence" (high demand for security, low demand for accuracy and updating rate), and the performance value for locating (high requirement for accuracy and updating rate). This can, however, lead to problems if, for example, only one or a few communication cycles can be carried out, and no ranging can achieve the security threshold (i.e. no security result is present).

In addition to these conflicting goals, the implementation of the first path search itself takes further parameters, such as the actual signal amplitude or the signal-to-noise ratio, into consideration. It is advantageous to resolve the conflict in goals between security and performance arising in the first path determination as transparently as possible in a ToF result, and to integrate it into the first path search.

The detection of what is known as the peak path can be carried out with a very high security level, without at the same time having to accept compromises in the sensitivity or performance. For a proper implementation it is thus assumed that it is not possible for an attacker to simulate a peak path by guessing an STS. The peak path is assumed to be trustworthy.

The following relationships can furthermore be established:

1. Security Risk

Achieving the highest possible distance gain is attractive to an attacker, since it is thereby possible to cover larger wireless link extensions. The seriousness of the damage must be assessed as all the greater as the achievable distance gain becomes greater. To limit the risk, the probability of achieving a high distance gain can be reduced. The distance gain is proportional to the time interval between the detected first path and the peak path in the CIR.

Conversely, the damage is low if the distance gain is small, i.e. the interval between the first path and the peak path in the CIR is low. In this case, a somewhat higher probability of success for the attacker is acceptable.

Numerical Values:

A distance gain that is useful for the attacker amounts to several meters, for example at least 3 m. Otherwise, even attack scenarios at the value limits, such as what is known as the front door attack (where only a small wireless link extension is necessary) are not even theoretically possible. It is also to be borne in mind that the requirements for the distance gain for a practical realization are significantly higher again, since any apparatus used by the attacker brings latencies into the signal path.

2. Accuracy Improvement

A relevant improvement in accuracy can arise with a more precise recognition of the first path, already in comparison with the first small time differences between the first path and the peak path, since the accuracy being sought is at least an order of magnitude lower than the distance gain for a relevant attack.

It has also been found in practice that in the majority of multipath scenarios, the time difference between the first path and the peak path is small, and large differences that correspond to a range of several meters are very rare.

Numerical Values:

For vehicle access systems, the accuracy sought for is around +/−10 cm. This is necessary in order to ensure a precise zone recognition on approach, as well as enabling a reliable recognition of the interior/exterior.

In many multipath scenarios, the error resulting from failure to recognize the true direct path is a few meters, usually less than 1.5 m, cf. FIG. 1.

3. Performance Requirement for First Path Dynamic Range

It can be deduced from practical considerations that the requirements of the first path dynamic range fall if the time difference between the peak path and the first path increases: for a given scenario, the first path reception level always remains the same (for example, a given distance and body attenuation), while the reception level for the peak path (=reflected signal) falls as the difference rises (=longer reflection path), so that the ratio between the levels of the first path and the peak path falls.

Figure 2:
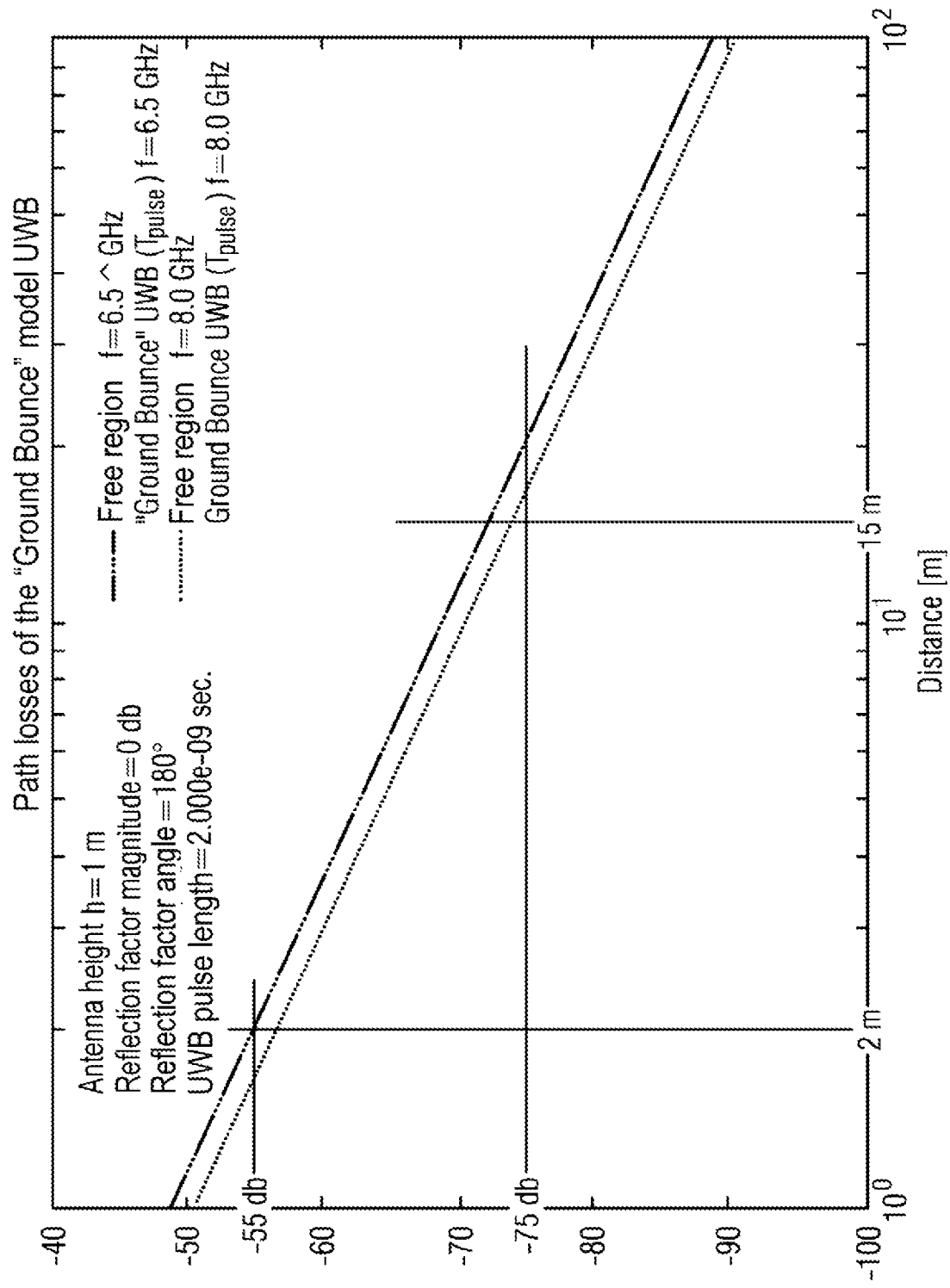
FIG. 2 shows a path loss model for UWB (free space and ground bounce) at 6.5 GHz and 8.0 GHz.

One example for this is what is known as the back pocket scenario shown in FIGS. 2 and 3.

FIG. 2 shows here a path loss model for UWB (free space and ground bounce) at 6.5 GHz and 8.0 GHz. FIG. 3 shows a numerical example for first path dynamic requirements.

The user is standing, for example, 2 m in front of the car. The direct path (2 m) is heavily attenuated (35 dB) by body shadowing. The signal reflected (for example from the garage wall) is, however, very strong.

According to the UWB path loss model (FIG. 2) the attenuation of the direct path is 55 dB for a distance of 2 m. The total attenuation, including 35 dB of body shadowing, is thus 90 dB.

If we assume that the reflection path is only slightly longer (the garage wall is very close), for example 1 m longer than the direct path (line 25 in the table of FIG. 3), an attenuation of the reflected path of 59 dB results, and a necessary first path dynamic range of 31 dB (=90 dB−59 dB).

If a longer reflection path is assumed (the garage wall is further away), for example 10 m longer than the direct path (cf. line 30 in the table of FIG. 3), then the attenuation of the reflected path is already 71 dB, and the necessary first path dynamic range is only 19 dB (=90 dB−71 dB).

The following approach to a solution results from these considerations:

1. Implementing a characteristic curve with a changeable security margin for the threshold during the first path search.
2. The security margin is rising, or rising monotonically, with increasing $\delta$. $\delta$ refers below to the time interval between the time of flight of the peak path signal and a point in the CIR, cf. also FIG. 4.
3. A first path is no longer accepted above a certain interval $\delta_{max}$.
4. The characteristic curve exhibits a minimum security margin M1 that can also be 0.
5. The characteristic curve exhibits a maximum security margin M2 that can already be achieved before $\delta_{max}$.
6. The precise nature of the characteristic curve can be defined by means of functional specifications or of a lookup table (LUT).

Figure 4:
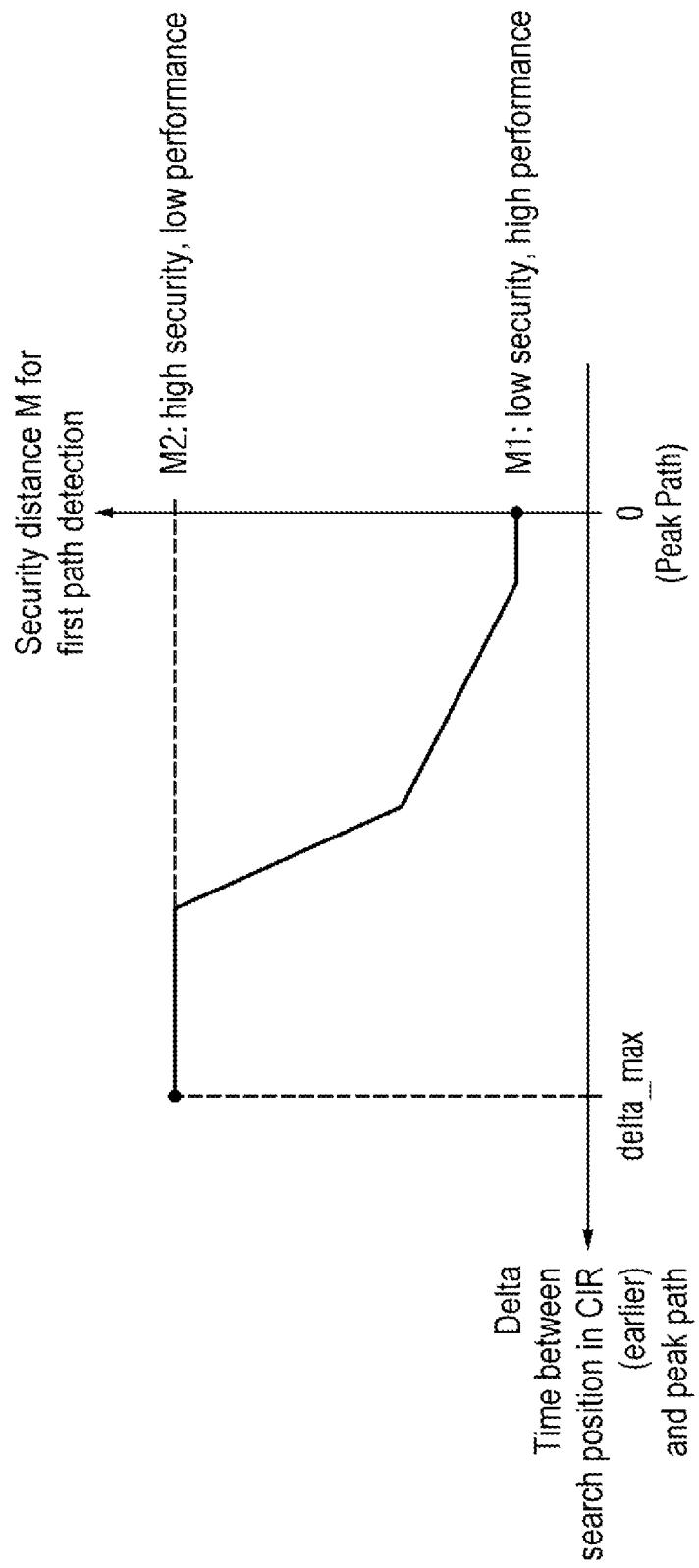
FIG. 4 shows a characteristic curve for a first path search that requires a higher security margin as the time difference ($\delta$) between the first path and the peak path becomes greater.

FIG. 4 shows, by way of example, a characteristic curve for such a security margin.

As can be seen from the characteristic curve of FIG. 4, the first path search usually requires a higher security margin as the time difference between the first path and the peak path becomes greater. Segments of this curve can, however, also extend horizontally or have a positive gradient. The precise form of the curve can depend on the associated application.

Figure 5:
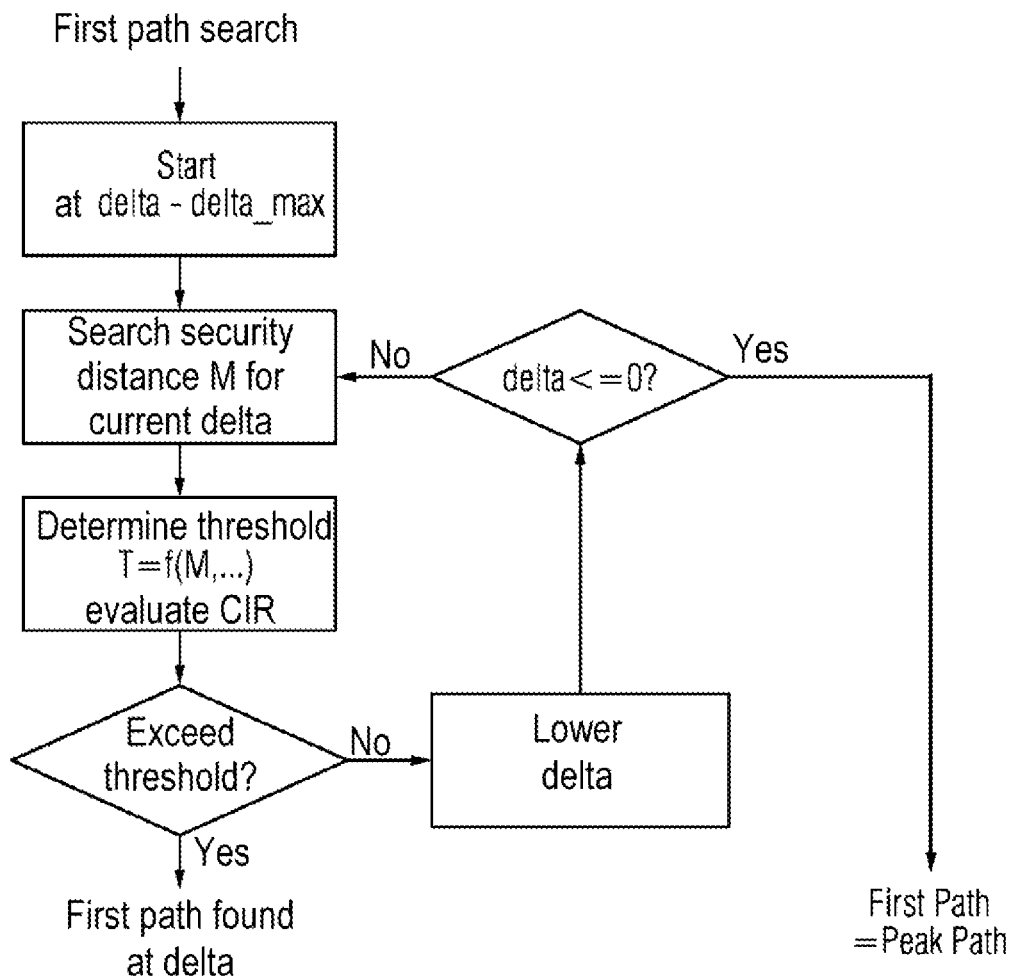
FIG. 5 shows an example of an implementation of the first path search with a $\delta$-dependent security margin.

FIG. 5 shows a flow diagram of a method for operating a motor vehicle access or locating system. A first path search takes place first, i.e. an identification of a received signal that has travelled from a transmitter to a receiver of a control device along the strongest signal path, the peak path. Once this peak path signal has been identified, the search advantageously begins at the maximum possible time interval $\delta_{max}$ from the time of flight of the peak path signal. It is possible to interrupt the method prematurely if successful, i.e. when the first path signal is identified.

It can be provided that after this the security margin M for the current search interval $\delta$ is ascertained, for example using a lookup table. At the beginning of the method, the current search interval $\delta$ is, for example, $\delta_{max}$, and is then reduced step-by-step until the first path, or the corresponding time of flight, was ascertained.

The threshold value T for the desired reliability of the (error-free) first path search is then ascertained depending on M. The specification of T can contain further dependencies and can, for example, depend on the signal to noise ratio. If the threshold value T for the reliability of the first path search for the current search interval $\delta$ is exceeded (positive criterion), this $\delta$ is declared to be the "first path". In this case the search is ended, since an earlier time point for the first path can no longer be found.

An additional optimization can be achieved if the parameters for the characteristic curve shown in FIG. 4, and thereby the security profile of the implementation, can be adjusted in accordance with the use and the situation.

A function-dependent adjustment of the security profile can, for example, take place in that, for example, the access function to the vehicle has to satisfy tighter security requirements than, for example, the "welcome lighting".

The installation position can also have an influence on the adjustment of the security profile. Transceivers installed in the interior have, for example, a different characteristic curve from those installed on the exterior, since the expected reflection behavior (and thereby the requirements for detecting the first path) are different. A location-dependent adjustment of the security profile is also possible, for example in particular at locations where the risk of theft is higher, where the curve, for example, becomes steeper and/or is shifted upwards.

It is also possible to perform a time-dependent adjustment of the security profile. The curve can, for example, be shifted upwards at night in comparison with daytime. It is also possible to raise this security level when the time for which the vehicle has been stationary is increased.

Protocol-dependent adjustments are also possible. A different relay attack prevention method can, for example, be employed in parallel. If, for example, other mechanisms are employed for relay attack prevention, the security level can be appropriately adjusted (lowered). Examples of such mechanisms are user recognition through lidar/radar, facial recognition, plausibility checking of the access by means of movement sensor data in the key/mobile component, or also through carrying out the ToF measurement repeatedly.

A parametric control of the security level of an implementation can be performed through the method described above. A simple integration into existing implementations (first path search) is possible.

Figure 6:
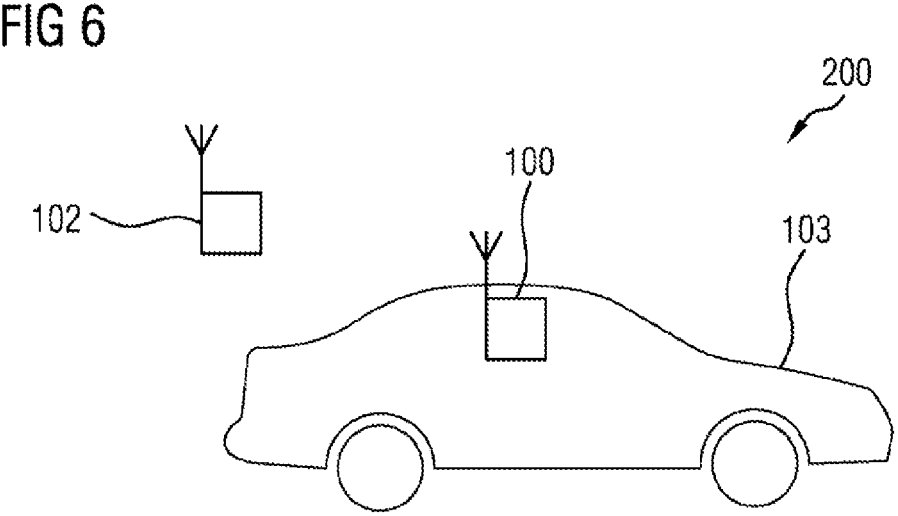
FIG. 6 shows a motor vehicle access or locating system.

FIG. 6 shows an access or locating system 200 with a control device 100 that is installed in a vehicle 103, and a radio key 102 that represents the transmitter described further above.

The invention claimed is:

1. A control device for a motor vehicle access or locating system, configured to:
    identify a received signal that has travelled from a transmitter to a receiver of the control device along a strongest signal path, a peak path, as a peak path signal;
    determine time of flight, ToF, of the peak path signal;
    determine a time interval, $\delta$, of the time of flight of the peak path signal;
    determine a threshold value, T, for reliability of a first path search depending on $\delta$;
    carry out the first path search at $\delta$ taking the threshold value into consideration;
    conclude that no first path signal has been detected when the threshold value, T, was not exceeded;
    determine a new threshold value, $T_{new}$, for the reliability of a renewed first path search depending on a new enlarged or reduced time interval, of the time of flight of the peak path signal; and
    carry out a renewed first path search with the new reduced or enlarged time interval taking the new threshold value into consideration.

2. The control device as claimed in claim 1, configured to:
    classify a signal detected in the first path search as a first path signal when the threshold value, T, was exceeded; and
    end the first path search.

3. The control device as claimed in claim 1, wherein the new threshold value, $T_{new}$, is smaller than or equal to original threshold value, T, when the time interval to the time of flight of the peak path signal has reduced.

4. The control device as claimed in claim 1, configured to:
    adjust at least one of the threshold value, T, and a new threshold value, $T_{new}$, depending on function.

5. The control device as claimed in claim 1, configured to:
    adjust at least one of the threshold value, T, and a new threshold value, $T_{new}$, depending on at least one of installation position, location and time.

6. A vehicle with the control device as claimed in claim 1.

7. An access or locating system with the control device as claimed in claim 1, and a radio key.

8. A method for operating a motor vehicle access or locating system, having the steps of:
    identifying a received signal that has travelled from a transmitter to a receiver of a control device along a strongest signal path, a peak path, as a peak path signal;
    determining time of flight, ToF, of the peak path signal;
    determining a time interval, $\delta$, of the time of flight of the peak path signal;
    determining a threshold value, T, for reliability of a first path search depending on $\delta$;
    carrying out the first path search at $\delta$ taking the threshold value into consideration;
    concluding that no first path signal has been detected when the threshold value, T, was not exceeded;
    determining a new threshold value, $T_{new}$, for the reliability of a renewed first path search depending on a new reduced or enlarged time interval, of the time of flight of the peak path signal; and
    carrying out a renewed first path search with the new reduced or enlarged time interval, taking the new threshold value into consideration.

9. The method as claimed in claim 8, wherein the new threshold value, $T_{new}$, is smaller than or equal to original threshold value, T, when the time interval to the time of flight of the peak path signal has reduced.

10. The method as claimed in claim 8, further comprising:
    adjusting at least one of the threshold value, T, and a new threshold value, $T_{new}$, depending on function.

11. The method as claimed in claim 8 further comprising:
    adjusting at least one of the threshold value, T, and a new threshold value, $T_{new}$, depending on at least one of installation position, location and time.

12. A non-transitory computer-readable medium with a program element stored therein that, when executed on a control device of a motor vehicle access or locating system, instructs the control device to carry out the following steps:
    identifying a received signal that has travelled from a transmitter to a receiver of a control device along a strongest signal path, a peak path, as a peak path signal;
    determining time of flight, ToF, of the peak path signal;
    determining a time interval, $\delta$, of the time of flight of the peak path signal;
    determining a threshold value, T, for reliability of a first path search depending on $\delta$;
    carrying out the first path search at $\delta$ taking the threshold value into consideration;
    concluding that no first path signal has been detected when the threshold value, T, was not exceeded;
    determining a new threshold value, $T_{new}$, for the reliability of a renewed first path search depending on a new reduced or enlarged time interval, of the time of flight of the peak path signal; and
    carrying out a renewed first path search with the new reduced or enlarged time interval, taking the new threshold value into consideration.

13. The computer-readable medium as claimed in claim 12, wherein the new threshold value, $T_{new}$, is smaller than or equal to original threshold value, T, when the time interval to the time of flight of the peak path signal has reduced.

14. The computer-readable medium as claimed in claim 12, wherein the steps further comprise:
    adjusting at least one of the threshold value, T, and a new threshold value, $T_{new}$, depending on function.

15. The computer-readable medium as claimed in claim 12, wherein the steps further comprise:
    adjusting at least one of the threshold value, T, and a new threshold value, $T_{new}$, depending on at least one of installation position, location and time.

* * * * *